United States Patent
Jin

(10) Patent No.: US 10,520,024 B2
(45) Date of Patent: Dec. 31, 2019

(54) ELECTROMAGNETICALLY ENABLED ACTIVE DYNAMIC PRESSURE GAS BEARING

(71) Applicant: Technologies' Xanadu of Resonatory-Solar-Systemed Co., Ltd., Beijing (CN)

(72) Inventor: Pu Jin, Beijing (CN)

(73) Assignee: Technologies' Xanadu of Resonatory-Solar-Systemed Co., Ltd., Beijing (CN)

( * ) Notice: Subject to any disclaimer, the term of this patent is extended or adjusted under 35 U.S.C. 154(b) by 0 days.

(21) Appl. No.: 15/558,425

(22) PCT Filed: Mar. 15, 2016

(86) PCT No.: PCT/CN2016/076386
§ 371 (c)(1),
(2) Date: Jan. 4, 2018

(87) PCT Pub. No.: WO2017/147949
PCT Pub. Date: Sep. 8, 2017

(65) Prior Publication Data
US 2019/0120292 A1   Apr. 25, 2019

(30) Foreign Application Priority Data

Mar. 4, 2016   (CN) .......................... 2016 1 0125381

(51) Int. Cl.
| | | |
|---|---|---|
| F16C 32/06 | (2006.01) | |
| F16C 17/02 | (2006.01) | |
| F16C 32/04 | (2006.01) | |

(52) U.S. Cl.
CPC ........ *F16C 32/0607* (2013.01); *F16C 17/024* (2013.01); *F16C 32/048* (2013.01);
(Continued)

(58) Field of Classification Search
CPC ............... F16C 32/0402; F16C 32/048; F16C 32/0607; F16C 32/0637; F16C 2300/22; F16C 17/024; F16C 17/042
See application file for complete search history.

(56) References Cited

U.S. PATENT DOCUMENTS

| | | |
|---|---|---|
| 5,519,274 A | 5/1996 | Scharrer |
| 5,714,818 A | 2/1998 | Eakman et al. |

(Continued)

FOREIGN PATENT DOCUMENTS

| | | |
|---|---|---|
| CN | 1730959 A | 2/2006 |
| CN | 101044332 A | 9/2007 |

(Continued)

OTHER PUBLICATIONS

Machine Translation of JP 2008-151209 (Year: 2008).*

(Continued)

*Primary Examiner* — Alan B Waits
(74) *Attorney, Agent, or Firm* — Knobbe Martens Olson & Bear LLP

(57) ABSTRACT

An electromagnetically enabled active dynamic pressure gas bearing is provided and includes an electromagnetic bearing and an elastic foil bearing sleeved between the electromagnetic bearing and a rotor shaft. The elastic foil bearing includes a top layer elastic foil and a bottom layer elastic foil, the top layer elastic foil is made of non-magnetic material, and a plurality of separate magnetic material areas are distributed on a surface of the top layer elastic foil.

5 Claims, 3 Drawing Sheets

A-A

(52) U.S. Cl.
CPC .......... *F16C 32/06* (2013.01); *F16C 32/0637* (2013.01); *F16C 2300/22* (2013.01)

(56) References Cited

U.S. PATENT DOCUMENTS

| | | | | |
|---|---|---|---|---|
| 6,024,491 | A * | 2/2000 | Bak | F16C 17/024 |
| | | | | 384/103 |
| 6,135,640 | A * | 10/2000 | Nadjafi | F16C 17/024 |
| | | | | 310/90.5 |
| 6,469,411 | B2 * | 10/2002 | Lembke | F16C 17/024 |
| | | | | 310/51 |
| 2004/0042692 | A1 * | 3/2004 | Matsunaga | F16C 17/024 |
| | | | | 384/103 |
| 2004/0066991 | A1 | 4/2004 | Agrawal | |
| 2006/0208589 | A1 * | 9/2006 | Foshage | F16C 17/024 |
| | | | | 310/90 |
| 2008/0310779 | A1 | 12/2008 | Agrawal et al. | |
| 2015/0362012 | A1 * | 12/2015 | Ermilov | F16C 17/024 |
| | | | | 384/105 |

FOREIGN PATENT DOCUMENTS

| | | |
|---|---|---|
| CN | 101054995 A | 10/2007 |
| CN | 101225853 A | 7/2008 |
| CN | 101403414 A | 4/2009 |
| CN | 101799044 A | 8/2010 |
| CN | 101881300 A | 11/2010 |
| CN | 103256080 A | 8/2013 |
| CN | 103867571 A | 6/2014 |
| CN | 104895916 A | 9/2015 |
| CN | 205388095 U | 7/2016 |
| JP | 2008151209 A * | 7/2008 |

OTHER PUBLICATIONS

International Search Report and Written Opinion dated Dec. 9, 2016 in International Application No. PCT/CN2016/076386.
Office Action dated Jul. 31, 2017 in Chinese Application No. 201610125381.5 (Translation Provided by Global Dossier).
Office Action dated May 21, 2018 in Korean Application No. 10-2017-7029382.

* cited by examiner

Enlarged view of part B

ELECTROMAGNETICALLY ENABLED ACTIVE DYNAMIC PRESSURE GAS BEARING

CROSS-REFERENCE TO RELATED APPLICATION

This application is a U.S. National Phase application of PCT International Application No. PCT/CN2016/076386, filed on Mar. 15, 2016, designating the United States of America, which is an International Application of and claims the benefit of priority to Chinese Patent Application No. 201610125381.5, titled "ELECTROMAGNETICALLY ENABLED ACTIVE DYNAMIC PRESSURE GAS BEARING", filed with the Chinese State Intellectual Property Office on Mar. 4, 2016. The disclosures of the above-referenced applications are hereby expressly incorporated by reference in their entireties.

TECHNICAL FIELD

The present application relates to the technical field of high speed oil-free lubrication support equipment, in particular to an electromagnetically enabled active dynamic pressure gas bearing.

BACKGROUND

An electromagnetic bearing is a bearing which stably floats a rotor by an electromagnetic force with an axis position of the rotor being controlled by a control system. The bearing is generally called electromagnetic bearing or magnetic bearing and the most popular type in the related art is an active magnetic bearing (AMB). The electromagnetic bearing floats a rotor shaft at a special position by a magnetic force, thereby realizing functions of a traditional bearing, preventing the rotor from directly contacting with the bearing, dispensing with the lubricating and sealing, completely eliminating abrasion and reducing power consumption. The electromagnetic bearing has controllability, and the position of the rotor can be actively controlled and the rigidity and damping of the bearing can be adjusted by the control system. The electromagnetic bearing has the advantages such as a long work life, a large working temperature range and automatic balance. An electromagnetic bearing system is composed of four parts, that is, the rotor, a sensor, a controller and an actuator. The actuator includes an electromagnet, a power amplifier and so on.

Judging from the developments of magnetic bearings, many defects still exist. For example, all the core data and responses of the running of the magnetic bearing come from the position of the rotor, but an existing sensor which is used for determining a reference position of the rotor is usually apt to be disturbed by an adjacent electromagnetic field and an error of a sensor signal is usually a main reason for an emergent damaging breakdown caused on the magnetic bearing. However, because of the reasons such as a magnetic saturation property, an electromagnetic heating and so on of the material, the carrying capability of the electromagnetic bearing is limited.

A gas bearing is one type of mature bearing in the magnetic bearing technology and the gas bearing has a good self-adaptive property. The gas bearing can run for a long time in the condition of high temperature, high speed and high pollution, and because it does not need oil to lubricate and thus has a simple structure. Gas is used as a lubricating medium, therefore when the rotor is in a low speed running state, the gas bearing has a low carrying capability, and the damping and rigidity are also relative low, thereby causing a poor hot shutdown capability. Furthermore, in the start and stop stage, because the rotation speed of the gas bearing is decreased when the rotor starts and stops, thus causing a gas pressure to be insufficient in the shaft and a support force to be insufficient, and resulting in abrasion in the bearing which is unavoidable. Generally, both a sudden stop or a quick start of the gas bearing require an assistance of additional gas sources, after every start and stop are repeated for one time, a certain amount of using life is accordingly shortened and the reliability is caused to be decreased at the same time. The requirements of machining accuracy of structures and material of the gas bearing are very high and thus the application and development of the gas bearing are restricted and they are one of the main reasons that the gas bearing cannot be popularized in various industries with a low cost and a high reliability.

The gas magnetic hybrid bearing in the related art merely adds another set of complete magnetic bearing based on the structure and function of a set of complete static gas bearing. Generally, this method can only aim on increasing rotation accuracy. But the characters such as the production and maintaining cost and structure complexity are sharply increased instead, and thus the gas magnetic hybrid bearing can merely be a high price concept prototype and cannot be applied in large-scale industries.

For making up the defects of the gas magnetic hybrid bearing in the related art, a new gas magnetic hybrid bearing is expected. The working of a magnetic bearing is mainly used to correct the reference position between the bearing and the rotor. When a shock which is caused when the quality or accuracy of the gas bearing is not in a good condition, or a disturbance from outside makes walls of the rotor and a shaft sleeve to be in contact with each other, the rotor is actively drawn back by the magnetic bearing, thereby avoiding the touch between the rotor and the shaft sleeve and preventing an accident of journal sticking. The gas magnetic hybrid bearing can use a low cost sensor, decrease an electromagnetic disturbance and increase control efficiency. On one hand, the damping, rigidity and carrying capability of the magnetic bearing can be increased and on the other hand the defect that the gas bearing is hard to be controlled is also overcome.

SUMMARY

An object of the present application is to provide an electromagnetically enabled active dynamic pressure gas bearing, which has a simple structure and a low accuracy requirement, applies a gas-magnetic hybrid bearing structure, includes an adjustable magnetic flat foil and a low cost pressure sensor, and resolves the problems that a low speed carrying capability is poor and the bearing is eccentric after it has been disturbed, thereby causing leakage of lubricating airflow and making the gas bearing hard to be controlled, which exist in operation of the traditional dynamic pressure gas bearing.

An electromagnetically enabled active dynamic pressure gas bearing according to a specific technical solution of the present application includes an electromagnetic bearing and an elastic foil bearing sleeved between the electromagnetic bearing and a rotor shaft. The elastic foil bearing includes a top layer elastic foil and a bottom layer elastic foil, the top layer elastic foil is made of non-magnetic material, and a plurality of separate magnetic material areas are distributed on a surface of the top layer elastic foil.

Furthermore, the magnetic material areas are strip-shaped magnetic material areas, the strip-shaped magnetic material areas are uniformly distributed and a length direction of the strip-shaped magnetic material areas is parallel to a direction of an axis of the rotor shaft.

Furthermore, the magnetic material areas are dotted magnetic material areas, and the dotted magnetic material areas are uniformly distributed.

Furthermore, the top layer elastic foil is a flat foil and the bottom layer elastic foil is a waved foil, the flat foil is made of stainless steel band which is a non-magnetic material, and after the separate magnetic material areas are sprayed on the surface of the top layer elastic foil, the surface of the top layer elastic foil is covered by a ceramic coating.

Furthermore, the electromagnetically enabled active dynamic pressure gas bearing further includes an elastic foil bearing seat, a bearing housing and a pressure sensor; the electromagnetic bearing is located between the elastic foil bearing seat and the bearing housing; the elastic foil bearing seat is configured to mount the bottom layer elastic foil; and a probe of the pressure sensor passes through the elastic foil bearing seat to detect a gas pressure at the bottom layer elastic foil.

Furthermore, the enabled active dynamic pressure gas bearing further includes a left end cover and a right end cover; the electromagnetic bearing includes magnetic poles and coils wound on the magnetic poles; there are a plurality of the magnetic poles, the magnetic poles are mounted between the elastic foil bearing seat and the bearing housing and are uniformly distributed along a circumferential direction of the elastic foil bearing, and one end of the magnetic poles points to the axis of the rotor shaft; and the left end cover and the right end cover are located at two ends of the elastic foil bearing seat and the bearing housing and tightly press the magnetic poles.

Furthermore, there are eight pressure sensors, and the pressure sensors are located at an intermediate portion of the elastic foil bearing and are uniformly distributed along the circumferential direction of the elastic foil bearing; and there are eight magnetic poles and each of the magnetic poles is composed of stacked silicon steel sheets.

Furthermore, material of the elastic foil bearing seat, the left end cover and the right end cover is duralumin material.

Compared with the related art, the electromagnetically enabled active dynamic pressure gas bearing according to the present application has the following advantages:

(1) the top layer foil is provided with a plurality of magnetic material areas and the top layer foil is moderately transformed by the attraction of the magnetic pole of the electromagnetic bearing, thereby increasing the highest pressure at one side of the lubricating gas film of the bearing, preventing the lubricating gas from leaking, and improving the capability of anti-disturbance eccentricity hitting a wall and thus the carrying capability of the bearing is also improved;

(2) changes of gas pressure are collected by using low cost pressure sensors and the deformation of the top layer foil is controlled according to a simple control law such that a large rotor damping is provided and the rotor stability is improved; and under such a simple control, the requirement of process accuracy of the bearing is not high;

(3) the electromagnetic bearing and the elastic foil bearing, i.e., the gas bearing, use a sleeved and parallel type of structure, thereby shortening an axial length of the gas-magnetic bearing, simplifying the structure, and improving an integration level and the comprehensive performances of the bearing;

(4) the electromagnetic bearing cooperates with the elastic foil bearing, i.e., the gas bearing, and thus the dynamic performance and stability of the bearing in a high speed rotation state is improved; and (5) when the bearing is at a low speed and the dynamic pressure gas film has not been formed, the rotor is floated by the electromagnetic bearing, thus improving the low speed performance of the elastic foil bearing, i.e., the gas bearing.

The electromagnetically enabled active dynamic pressure gas bearing according to the present application has a simple structure, a convenient operation, a low accuracy requirement, a strong practicability and a low economy cost.

DETAILED DESCRIPTION

The technical solution of the present application is further described in conjunction with drawings of the specification.

Figure 1:
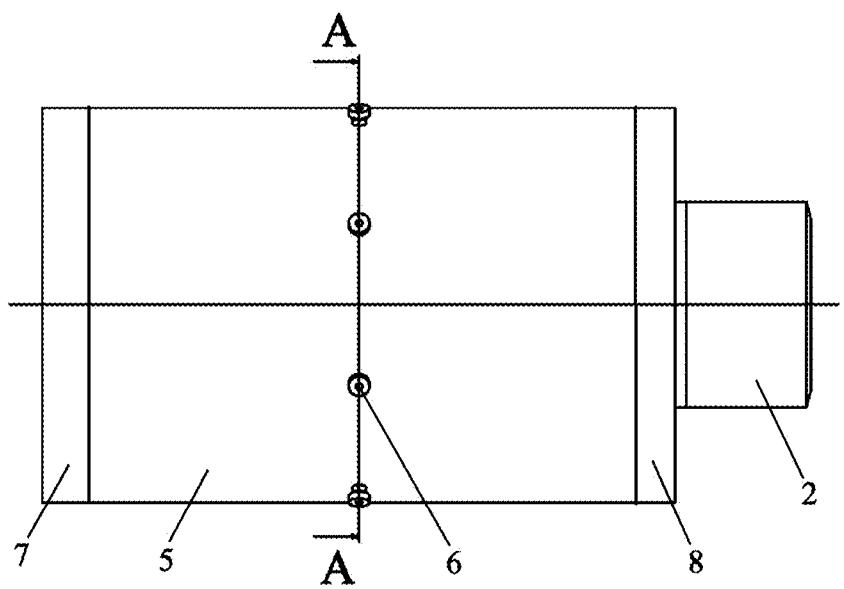
FIG. 1 is a front view of an electromagnetically enabled active dynamic pressure gas bearing according to the present application.
Figure 2:
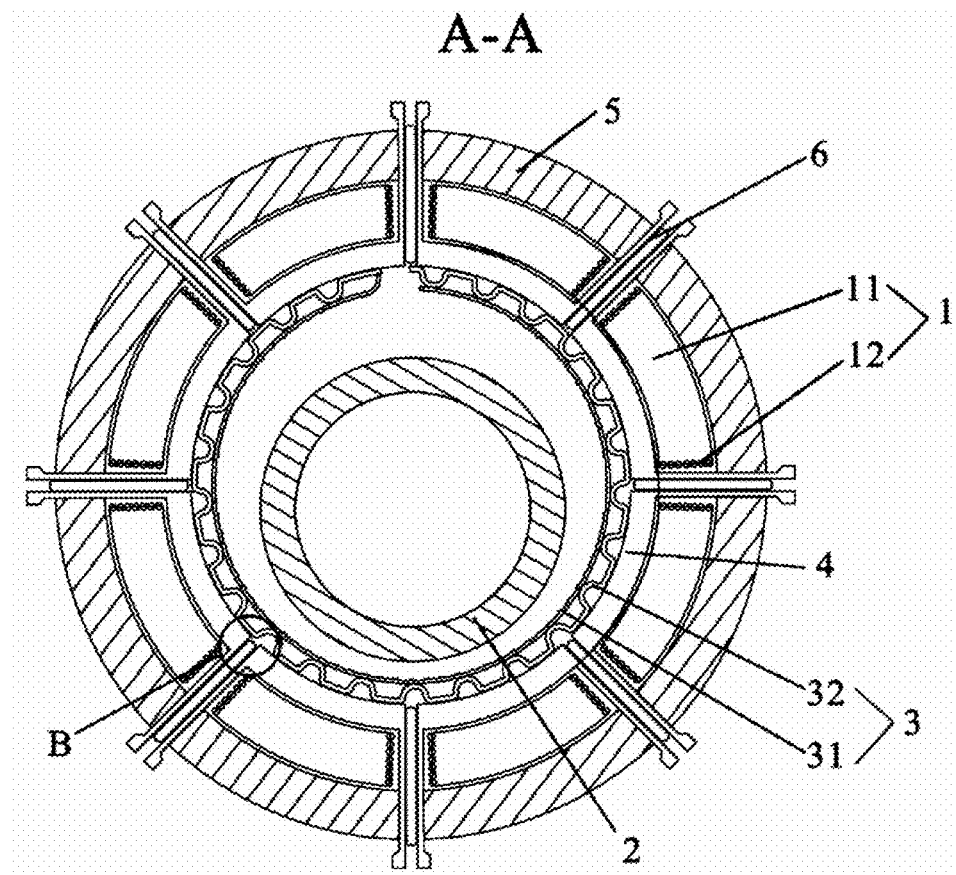
FIG. 2 is a sectional view along line A-A in FIG. 1.
Figure 3:
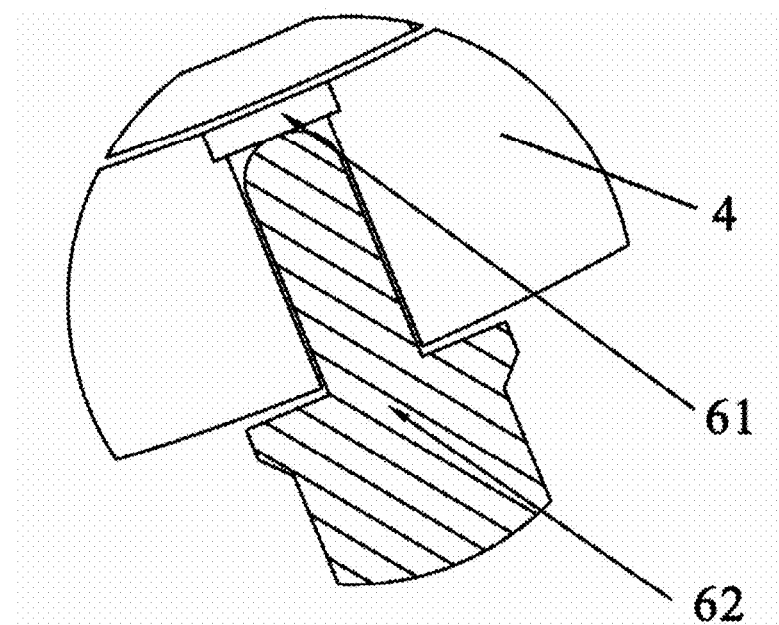
FIG. 3 is an enlarged view of a part B in FIG. 2.

As shown in FIG. 1 and FIG. 2, an electromagnetically enabled active dynamic pressure gas bearing according to the present application includes an electromagnetic bearing 1, an elastic foil bearing 3 sleeved between the electromagnetic bearing 1 and a rotor shaft 2, an elastic foil bearing seat 4, a bearing housing 5, a pressure sensor 6, a left end cover 7 and a right end cover 8. The elastic foil bearing 3 includes a top layer elastic foil 31 and a bottom layer elastic foil 32. The top layer elastic foil 31 is made of non-magnetic material and a plurality of separate magnetic material areas are distributed on a surface of the top layer elastic foil 31.

The electromagnetic bearing 1 is located between the elastic foil bearing seat 4 and the bearing housing 5, the elastic foil bearing seat 4 is configured to install the bottom layer elastic foil 32, and a probe of the pressure sensor 6 passes through the elastic foil bearing seat 4 to detect a gas pressure at the bottom layer elastic foil 32. The number of the pressure sensor 6 is eight, and the pressure sensors 6 are located at an intermediate portion of the elastic foil bearing, i.e., a gas bearing, and are uniformly distributed along a circumferential direction of the gas bearing. The pressure sensor 6 includes a pressure sensor cover 61 and a pressure sensor probe 62.

The electromagnetic bearing 1 includes a magnetic pole 11 and a coil 12 wound around the magnetic pole 11, the number of the magnetic pole 11 is eight and each magnetic pole 11 is formed by stacking and pressing silicon steel sheets. The magnetic poles 11 are mounted between the elastic foil bearing seat 4 and the bearing housing 5 and are uniformly distributed along a circumferential direction of the gas bearing, and one end of the magnetic poles 11 points to an axis of the rotor shaft 2. The left end cover 7 and the right end cover 8 are located at two ends of the elastic foil bearing seat 4 and the bearing housing 5 to tightly press the magnetic poles 11.

Material of the elastic foil bearing seat 4, the left end cover 7 and the right end cover 8 is non-magnetic duralumin material.

Figure 4:
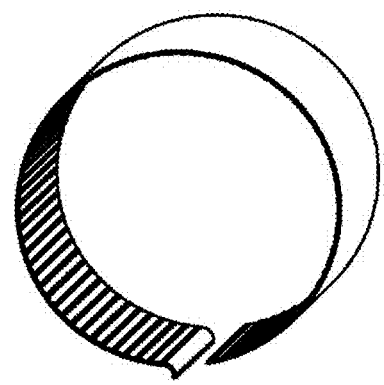
FIG. 4 is a schematic view showing an unfolded top layer foil having strip-shaped magnetic material of the electromagnetically enabled active dynamic pressure gas bearing according to the present application.
Figure 4:
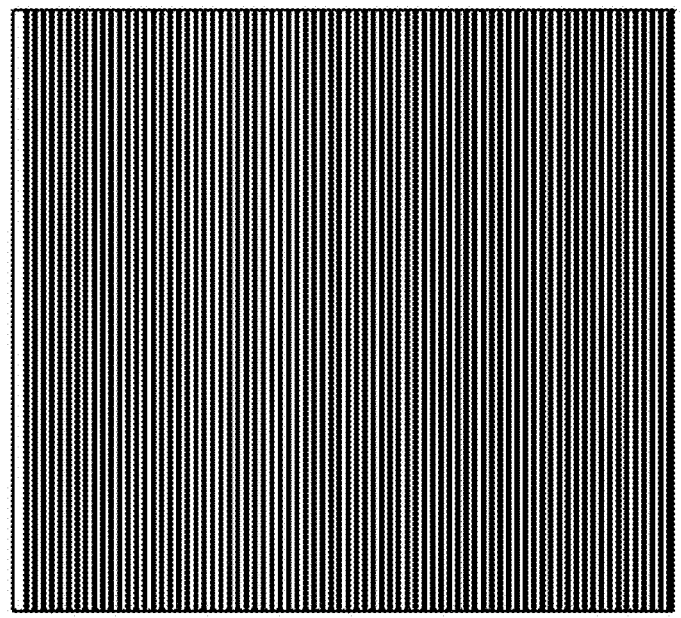
Figure 5:
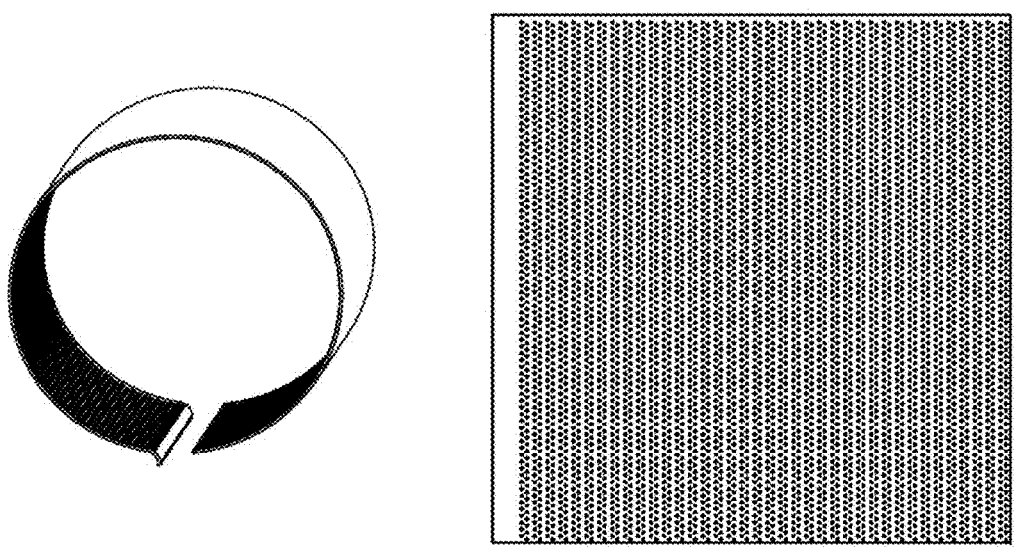
FIG. 5 is a schematic view showing an unfolded top layer foil having dotted magnetic material of the electromagnetically enabled active dynamic pressure gas bearing according to the present application.

As shown in FIG. 4 and FIG. 5, the magnetic material areas distributed on the surface of the top layer elastic foil 31 are strip-shaped magnetic material areas or dotted magnetic material areas, the strip-shaped magnetic material areas or the dotted magnetic material areas are uniformly distributed and a length direction of the strip-shaped magnetic material areas is parallel to that of the axis of the rotor shaft 2. If the whole top layer elastic foil 31 is covered by magnetic material, a magnetic force will be greatly increased and complexity of stress condition of a restrictor sheet will be greatly increased in a control process. If the top layer elastic foil 31 does not have sufficient flexibility, an issue of curvature varying with deformation is apt to occur.

The top layer elastic foil 31 is a flat foil and the bottom layer elastic foil 32 is a waved foil. The flat foil is made of stainless steel band which is a non-magnetic material. After the plurality of the separate magnetic material areas is sprayed on the surface of the top layer elastic foil 31, the surface of the top layer elastic foil 31 is covered by a ceramic coating. The top layer elastic foil 31 may also be formed to be a plate by sintering ceramic nanometer micro mist which consists of 40% zirconia, 30% α aluminium oxide and 30% magnesium aluminate.

Figure 6:
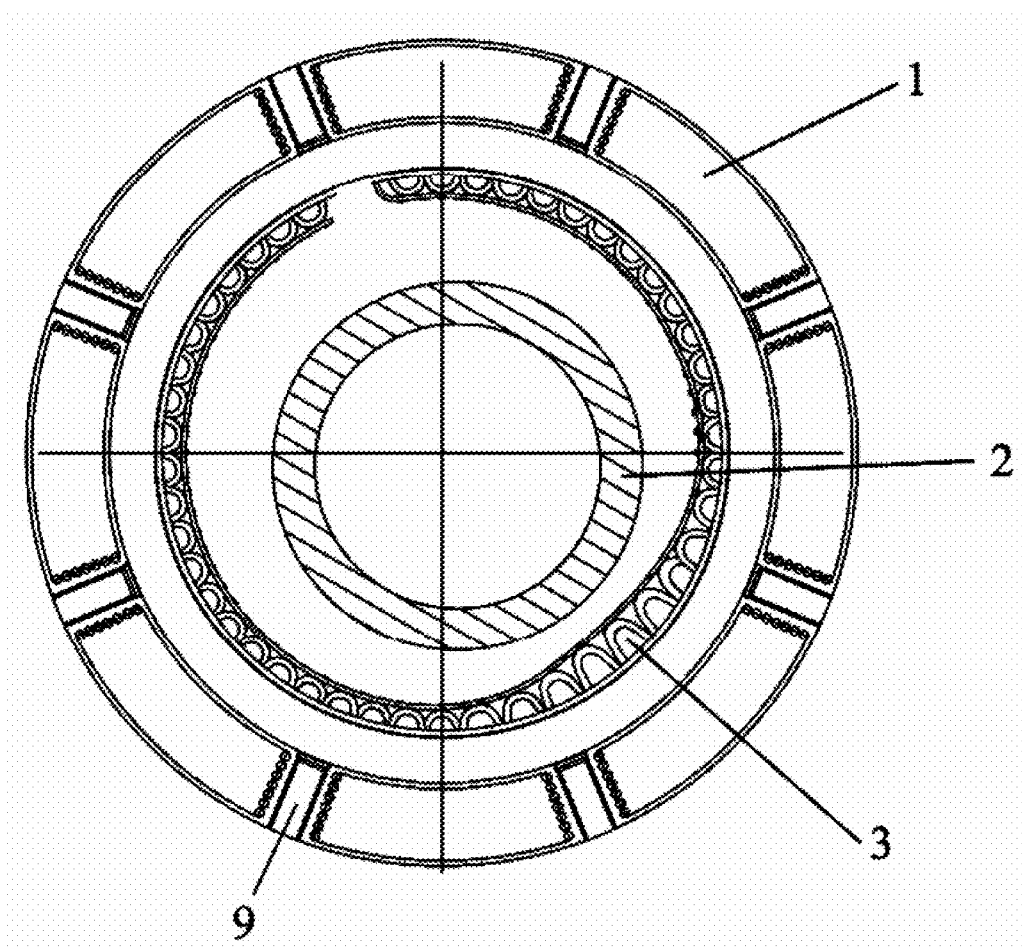
FIG. 6 is a schematic view showing a deformation of the top layer foil of the electromagnetically enabled active dynamic pressure gas bearing according to the present application.

As shown in FIG. 6, a section of the rotor shaft 2 may not be an ideal circle in real life. When an out-of-roundness affects the pressure of a gas film during a rotation process, the top layer elastic foil 31 of the gas bearing moves downward and thus the pressure of a lower cavity increases and the pressure of an upper cavity decreases.

After a bearing gap is increased for decreasing an accuracy of the rotor shaft, the effect to a gas film pressure and a distribution thereof from the out-of-roundness of the rotor shaft 2 is correspondingly decreases. After the dynamic pressure gas bearing, which increases the bearing gap, reaches a sufficient rotating speed, finishes a starting up and reaches a balanced state, both a bearing rigidity and a carrying capacity thereof are decreased compared with a bearing which has a smaller bearing gap. In this case, a magnetic bearing is required to be introduced to make up this point.

When a loading is loaded on the rotor shaft 2 and the rotor shaft 2 gradually descends and approaches the top layer elastic foil 31, the electromagnet bearing 1 may receive a signal of increased gas pressure transmitted from the pressure sensor 6 and gets involved to work. A magnetic force is not completely and directly acted on the rotor shaft 2 by the electromagnetic bearing 1 to make the rotor shaft 2 to be suspended, but the magnetic force actively pushes up the top layer elastic foil 31 to actively increase the pressure of the lower cavity, adapt to the weight loaded on the rotor shaft 2 and automatically redistribute airflow pressures in all directions in the bearing. When the rotor shaft 2 reaches a new balance position, the electromagnet bearing 1 stops working unless a new disturbance occurs.

When an external shock disturbance occurs, the rotor shaft 2 may rapidly approach the top layer elastic foil 31. If the gas bearing, cannot timely make a response at this moment, it is possible to cause that a flow speed of a partial gas approaches or even reaches the speed of sound because the gap is too small in an instant, thereby causing a shock wave to generate a phenomenon of gas hammer self-excitation. The occurrence of the shock wave will cause the flow of partial gas to generate a disturbance and a chaos. When the fluid speed changes between the speed of sound and the subsonic speed, the pressure thereof significantly decreases in a step manner. In this case, the principle of hydrodynamic force is opposite to that in a usual case, that is, the flow gap between a surface of the rotor shaft 2 and the top layer elastic foil 31 is smaller and the pressure is lower instead. In this case, the top layer elastic foil 31 is required to actively avoid the surface of the rotor shaft 2 and create a larger flow gap to keep the gas flow speed in a subsonic speed range as far as possible and to maintain a normal flow pressure.

In such a working condition that the compensation capability of the gas bearing is beyond, if the gas bearing is wished to keep normally working, an external force is required to be introduced to readjust the relative position between the top layer elastic foil 31 and the rotor shaft 2. It is equivalent to use the action of the electromagnetic bearing 1 to forcedly open a gap between the rotor shaft 2 and the top layer elastic foil 31 at a narrow place. At this time, the magnetic poles at two ends in this direction should be controlled to be excited by the same polarity. An attraction is generated in a direction of a small gap to draw back the top layer elastic foil 31 and an attraction is generated in a direction of a large gap to draw back the rotor shaft 2. A magnetic force difference is generated by using an operating distance difference of magnetic forces at two ends, to pull the rotor shaft 2 to recover a normal gap between the rotor shaft 2 and the top layer elastic foil 31 and thus make the airflow and working condition of the gas bearing, to return to a balanced state again. If the same situation happens to a traditional gas-magnetic hybrid bearing which has a low process requirement (a large gap), since the gas bearing loses the self-adaptive and adjustable capability, the rotor will be continually pressed toward one side of a shaft sleeve by an air pressure difference but the electromagnetic bearing will generate a magnetic force and try to pull the rotor. Thus, mutual confrontation is formed between the two bearings. In this case, the gas bearing often has a stronger bearing rigidity and thus it causes a series of problems which seriously affect the working and performance of the bearings, such as the two sets of bearing systems continually saw away and generate sharp shakings or they are locked in a stalemate and thus the rotor cannot return to a normal working condition, and they are always rigid to each other and so on.

A set of displacement sensors 9 (shown in FIG. 6) are still required to be retained in the dynamic pressure gas bearing according to the present application. The dynamic pressure gas bearing does not have any assistance of external gas sources and it has to rely on its own structure to generate a gas source. Therefore, the gas-magnetic hybrid bearing based on such dynamic pressure gas bearing usually needs to retain the capability of "0 start" and "hot shutdown". When the rotor has a very low rotating speed or about to stop, the gas source pressure of the gas bearing, is very low and cannot completely bear the weight of the rotor, and serious abrasions are apt to occur at this time. Therefore, the displacement sensor is required to get involved at this period, the rotor is temporarily held up by actively using the electromagnetic bearing 1 and then the rotor is switched to other working conditions when the rotating speed of the rotor increases till it meets a loading condition of the gas bearing, or decreases to be close to an ideal working condition that a stop has been finished.

It may be appreciated that, the above embodiments are only for illustrating the principle of the present disclosure, but the present disclosure is not limited herein. A person skilled in the art may make further modifications and improvements without departing from the principle of the present disclosure, and these modifications and improvements shall also fall within the scope of the present disclosure.

What is claimed is:

1. An electromagnetically enabled active dynamic pressure gas bearing, comprising an electromagnetic bearing and an elastic foil bearing sleeved between the electromagnetic bearing and a rotor shaft;
   wherein the elastic foil bearing comprises a top layer elastic foil and a bottom layer elastic foil, and wherein the top layer elastic foil is made of non-magnetic material, and a plurality of separate magnetic material areas are distributed on a surface of the top layer elastic foil;
   wherein the top layer elastic foil is a flat foil and the bottom layer elastic foil is a waved foil, the flat foil is made of stainless steel band which is a non-magnetic material, and after the separate magnetic material areas are sprayed on the surface of the top layer elastic foil, the surface of the top layer elastic foil is covered by a ceramic coating.

2. The electromagnetically enabled active dynamic pressure gas bearing according to claim 1, wherein the magnetic material areas are strip-shaped magnetic material areas, the strip-shaped magnetic material areas are uniformly distributed and a length direction of the strip-shaped magnetic material areas is parallel to a direction of an axis of the rotor shaft.

3. The electromagnetically enabled active dynamic pressure gas bearing according to claim 1, wherein the magnetic material areas are dotted magnetic material areas, the dotted magnetic material areas are uniformly distributed.

4. An electromagnetically enabled active dynamic pressure gas bearing, comprising an electromagnetic bearing and an elastic foil bearing sleeved between the electromagnetic bearing and a rotor shaft;
   wherein the elastic foil bearing comprises a top layer elastic foil and a bottom layer elastic foil, and wherein the top layer elastic foil is made of non-magnetic material, and a plurality of separate magnetic material areas are distributed on a surface of the top layer elastic foil;
   wherein the electromagnetically enabled active dynamic pressure gas bearing further comprises an elastic foil bearing seat, a bearing housing and a plurality of pressure sensors;
   wherein the electromagnetic bearing is located between the elastic foil bearing seat and the bearing housing; the elastic foil bearing seat is configured to mount the bottom layer elastic foil; and
   a probe of each of the pressure sensors passes through the elastic foil bearing seat to detect a gas pressure at the bottom layer elastic foil;
   wherein the electromagnetically enabled active dynamic pressure gas bearing further comprises a left end cover and a right end cover;
   wherein the electromagnetic bearing comprises magnetic poles and coils wound on the magnetic poles;
   there are a plurality of the magnetic poles, the magnetic poles are mounted between the elastic foil bearing seat and the bearing housing and are uniformly distributed along a circumferential direction of the elastic foil bearing, and one end of the magnetic poles points to the axis of the rotor shaft; and the left end cover and the right end cover are located at two ends of the elastic foil bearing seat and the bearing housing and press the magnetic poles;
   wherein the plurality of pressure sensors are located at an intermediate portion of the elastic foil bearing and are uniformly distributed along the circumferential direction of the elastic foil bearing; and there are eight magnetic poles and each of the magnetic poles is composed of stacked silicon steel sheets.

5. The electromagnetically enabled active dynamic pressure gas bearing according to claim 4, wherein material of the elastic foil bearing seat, the left end cover and the right end cover is duralumin material.

* * * * *